(12) United States Patent
Wing et al.

(10) Patent No.: US 8,826,281 B2
(45) Date of Patent: Sep. 2, 2014

(54) MANAGING DOCUMENT PUBLICATION USING TIME-DRIVEN JOB SCHEDULING

(75) Inventors: Paula A. Wing, Sammamish, WA (US); Daniel E. Kogan, Issaquah, WA (US); Patrick C. Miller, Sammamish, WA (US); William J. Griffin, Sammamish, WA (US); Nathan J. Fink, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1990 days.

(21) Appl. No.: 11/594,353

(22) Filed: Nov. 7, 2006

(65) Prior Publication Data
US 2008/0109808 A1 May 8, 2008

(51) Int. Cl.
G06Q 10/00 (2012.01)
G06Q 30/00 (2012.01)
G06F 15/16 (2006.01)
G06F 17/30 (2006.01)

(52) U.S. Cl.
CPC ............... *G06F 17/30011* (2013.01)
USPC ........... 718/100; 707/736; 707/781; 709/217; 709/219

(58) Field of Classification Search
USPC ........................................................ 707/802
See application file for complete search history.

(56) References Cited

U.S. PATENT DOCUMENTS

| 6,643,663 | B1 * | 11/2003 | Dabney et al. ................... 1/1 |
| 6,650,348 | B2 | 11/2003 | Mariani |
| 6,826,534 | B1 * | 11/2004 | Gupta et al. ............. 705/7.12 |
| 6,910,049 | B2 * | 6/2005 | Fenton et al. ..................... 1/1 |
| 7,039,472 | B2 * | 5/2006 | Sugimoto et al. ............ 700/14 |
| 7,240,077 | B1 * | 7/2007 | Edelman et al. .................. 1/1 |
| 7,640,318 | B1 * | 12/2009 | Hull et al. .................... 709/217 |
| 2002/0065851 | A1 * | 5/2002 | Watson et al. ............... 707/513 |
| 2002/0161603 | A1 * | 10/2002 | Gonzales ......................... 705/1 |
| 2002/0161890 | A1 * | 10/2002 | Chen .............................. 709/226 |

(Continued)

FOREIGN PATENT DOCUMENTS

CA 2303466 A1 9/2001

OTHER PUBLICATIONS

Ying Wu ("the use of web publishing technologies in environmental NGOs—Blog, RSS/Atom and Wiki" ; Brandenburg Technical University; Feb. 2, 2006; pp. 1-56).*

(Continued)

*Primary Examiner* — Emerson Puente
*Assistant Examiner* — Benjamin Wu
(74) *Attorney, Agent, or Firm* — Thomas Wong; Brian Halsam; Micky Minhas

(57) ABSTRACT

Document scheduling architecture for automatic publication and removal from publication of a document. A document can be developed, approved, and scheduled for automatic viewing and removal from viewing using start data and end data that are represented as job definitions. Based on a triggering event, the jobs are selected and executed to effect document publication. The document is automatically published making it viewable by all users who have suitable permission to do so. The architecture provides a pluggable override scheduling, and hence, extensible scheduling solution for third-party entities to provide alternative approval and/or scheduling behavior. Other attributes include reporting to a user the status of a document, execution of a policy in combination with the document publication such that the policy overrides selected attributes of the publication state, and a management filter process wherein the document can be reviewed independently by another individual for veto of publication if desired.

20 Claims, 15 Drawing Sheets

(56) References Cited

U.S. PATENT DOCUMENTS

| | | | |
|---|---|---|---|
| 2003/0023638 A1* | 1/2003 | Weight | 707/526 |
| 2003/0037339 A1* | 2/2003 | Lee | 725/109 |
| 2003/0061611 A1* | 3/2003 | Pendakur | 725/46 |
| 2003/0189600 A1* | 10/2003 | Gune et al. | 345/810 |
| 2003/0200283 A1* | 10/2003 | Suryanarayana et al. | 709/219 |
| 2004/0078797 A1 | 4/2004 | Liao | |
| 2004/0260767 A1 | 12/2004 | Kedem | |
| 2005/0034065 A1* | 2/2005 | Weight | 715/513 |
| 2005/0102260 A1* | 5/2005 | Spring et al. | 707/1 |
| 2005/0102607 A1* | 5/2005 | Rousselle et al. | 715/501.1 |
| 2005/0114794 A1* | 5/2005 | Grimes et al. | 715/840 |
| 2005/0262439 A1* | 11/2005 | Cameron | 715/523 |
| 2006/0028252 A1* | 2/2006 | McCauley et al. | 327/120 |
| 2006/0074904 A1* | 4/2006 | Mungara et al. | 707/5 |
| 2006/0080316 A1* | 4/2006 | Gilmore et al. | 707/9 |
| 2006/0123334 A1* | 6/2006 | Balasubramanyan et al. | 715/513 |
| 2006/0168226 A1* | 7/2006 | Miller et al. | 709/226 |
| 2007/0094186 A1* | 4/2007 | Ramkissoon et al. | 706/45 |
| 2007/0109592 A1* | 5/2007 | Parvathaneni et al. | 358/1.15 |
| 2007/0179790 A1* | 8/2007 | Leitch et al. | 705/1 |

OTHER PUBLICATIONS

Microsoft "MCMS development using page object"; Springer, 2005, pp. 167-194.*
Glemm et al. Versioning extension to WebDav; the internet society, 2002, pp. 1-100.*
Glemm et al. "Web distributed authoring and versioning (WebDav) access control protocol" the internet society, 2004, 1-62.*
Robert D. Krause, Managing Higher Ed Web Sites: Balancing the Need for Timely Updates, the Requirements of Institutional Marketing and the Development of Content, delivery.acm.org/, Sep. 24, 2003, pp. 139-141.
Idetix Software Systems, Revise® Web Application: Scheduled Publishing, samford.edu, 2003, Idetix software systems 2003 pp. 6-22.
Wei Tang et al., Trigger grouping: A Scalable Approach to Large Scale Information Monitoring //ieeexplore.ieee.org/iel5/8549/27043/01201149.pdf?tp=8,arnumber=1201149&isnumber=27043, 2003, IEEE, 2003 pp. 8.

* cited by examiner

FIG. 14

MANAGING DOCUMENT PUBLICATION USING TIME-DRIVEN JOB SCHEDULING

BACKGROUND

The communication and management of information is core to the viability of companies. Corporate entities have long recognized the benefits of communicating information to and receiving feedback from customers and employees, for example. Web sites are emerging as the mechanism of choice for cost effectively communicating with large numbers of individuals. For example, corporate enterprise systems (or intranets) provide a way to pass information to employees about benefits, software updates, and health information. Corporations can provide private site access to preferred customers related to new products and services, accounts, etc. Hospitals now provide ways for patients to receive test results via web sites with secure login. Banks provide web site login for secure transactions, and so on. In other words, there are a large number of web sites for the dissemination of all types of information and user interaction. An equally enormous task then becomes maintaining and updating web site documents, content, and features.

Conventional authoring tools typically allow for the creation and posting of web documents to the intended web sites with manual uploading as part of the process. However, with the ever-increasing number of web sites and the corresponding larger number of web documents and content, this can become a daunting management task.

Authoring can include the creation of multiple document versions of different documents. For example, where two versions are utilized, these document versions can be referred to as checked-in and checked-out, published and unpublished, major and minor, etc. Maintaining a web site means that while one version of a document is posted for viewing, other new and updated documents may need to be in the pipeline for approval and eventual posting. While conventional products exist for making web pages and documents accessible, web site management still requires an increasing outlay of funds and resources to maintain web sites.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein is an automated document scheduling and publication architecture. The architecture facilitates the automatic publication and removal from publication of a document, page or image, for example. In a more specific implementation, a web document can be authored, approved, and scheduled for automatic viewing and removal from viewing at a web site. The web site can be a public web site, an intranet web site, or specific area of the web site to which access by certain individuals (e.g., customers, buyers, distributors) is allowed.

Publication start data (e.g., start date) and end data (e.g., end date) for a given document can be represented as corresponding job definitions, which definitions are executed when the data matches a background timer, for example, that indicates the jobs should be executed. In another implementation, the registration and implementation of the start and end job definitions can be triggered by a background process, which can be when an author sends a command that indicates the start of an approval process.

The document can be automatically published at a future date making it viewable by all users who have suitable permissions to a web site area, and taken offline (or unpublished) at a future end date so that stale data will not remain live on the web site.

The architecture provides a pluggable, and hence, extensible scheduling solution, by allowing third-party entities (e.g., customers or partners) to provide alternative (or custom) scheduling solutions. Moreover, override scheduling and approval of documents is provided allowing the third-party entity to register custom approval workflows or use the standard approval workflow thereby avoiding accidental publication of the document before the document was intended to go live.

The architecture also facilitates reporting to a user of the status of a document, the execution of one or more policies (e.g., a retention policy) in combination with the document publication such that the policy can override selected attributes of the scheduling and/or publication processes. A management filter is provided wherein document status of various web sites and documents can be searched, presented and reviewed remotely if desired.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 14 illustrates one implementation of a user interface for scheduling document publication.

DETAILED DESCRIPTION

Figure 1:
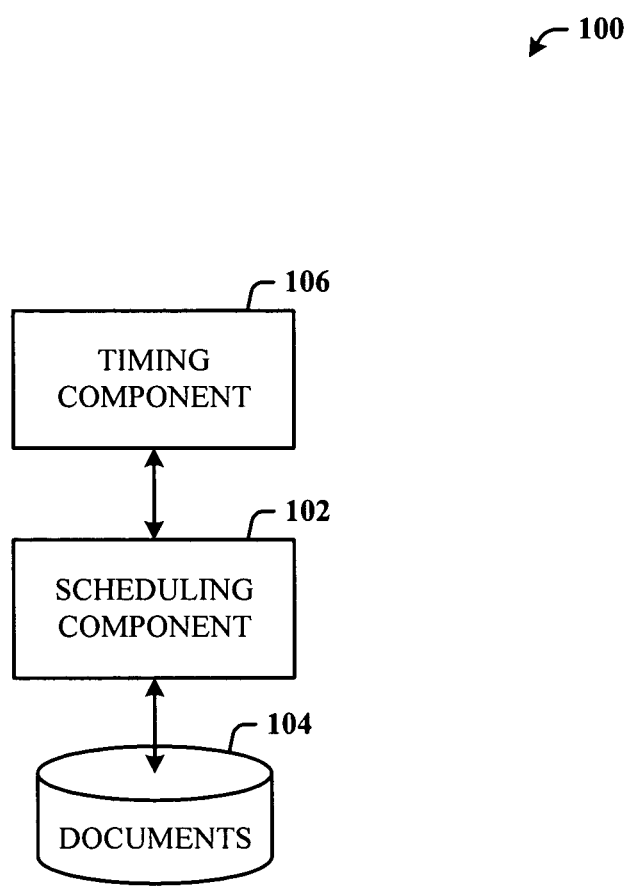
FIG. 1 illustrates a system that manages document access in accordance with the innovation.

Described herein is an automated document scheduling and publication architecture in a document versioning environment for the automatic publication and removal from publication of documents. Triggering events (e.g., start time and end time) for a given document can be stipulated via a user interface as part of an authoring and scheduling process, each of which can be represented as job definitions that are executed when the event information triggers execution of the jobs. For example, where the triggering event is based on time, it is to be understood that "time" as used herein can refer to the time of day, day of the week, date, year, and other temporal metrics (e.g., second, hour).

The triggering event can also be based on other metrics, for example, author, type of document content, type of document, and so on. For example, if the author is designated as a high-priority individual by some internal mechanism, when the author selects the document for publication, the document can be published immediately, thereby bypassing the scheduling process.

In a more specific application of the publication architecture, a web document can be authored, approved, and scheduled for automatic viewing at a future date according to a start date job, and removed from viewing at a web site thereafter according to an end date job. The web site can be a public web site, an intranet web site, or specific area of the web site to which access by certain individuals (e.g., customers, buyers, distributors) is allowed.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 that manages document access in accordance with the innovation. The system 100 can include a scheduling component 102 for configuring scheduling information associated with allowing access to one or more documents. For example, the documents stored in a data store 104 can be web pages intended for viewing at a web site at a predetermined point in time. As described herein, a user interface is provided whereby a user can interact with a scheduling interface for configuring when the document(s) are to be allowed accessed for viewing. The scheduling component 102 bundles the scheduling information as a job for execution at the appropriate time.

The system 100 can also include a timing component 106 for receiving the scheduled job from the scheduling component 102 and registering the job for execution in accordance with a predetermined event. For example, the event can be time based, in that, when the time defined in the job is reached, the timing component 106 executes the job effecting publication of the document(s) on the desired web site(s). Users having the appropriate permission(s) can then view the document.

In a more specific application, the document is a web page intended for viewing at a web site or a designated area of the web site. The web page author creates the web page, and once the web page has passed an approval process (described herein), the web page can be scheduled for publication according to a start date and end date. The start job is created and registered with the timing component 106, as is the end job. When a clocking mechanism (a timer) aligns in time with the corresponding execution time of the start job (or end job), the start job (or end job) is executed.

Job execution, in one instance, can cause moving of the document from a minor status (unpublished or draft) to a major status (or publication), or vice versa. In an alternative instance, job execution can include an approval process as part of publication. The system 100 operates to then select the web page associated with the start job, and post the web page for viewing. Similarly, when the clocking mechanism aligns in time with the corresponding execution time of the end job, the end job is executed. The web page is then automatically removed from viewing at the web site by classifying the web page from major to minor, for example. It is to be understood that removal from viewing at a web site does not mean removal from viewing of all users. For example, the author may retain viewing permissions of the web page. In one implementation, it may only be that the web page was moved to a container (e.g., on the web site) where permissions are such that viewing is permitted by only a select few users (e.g., including the author). In another implementation, only a select few users have the required permissions to the minor version of the page.

In another implementation, the versioning environment allows for categorizing documents as not only minor and major, but also checked-out. Accordingly, scheduling can include configuring scheduling information related not only to publication as a major/minor document, but also as a checked-out document. In one example, scheduling is postponed when the document is checked out, but reinstated when the document is returned for scheduling. In another example, checking the document out causes an approval process to restart followed by scheduling, or as part of the scheduling process. These are just a few examples of the flexibility that can be obtained through utilization of the disclosed architecture.

The timing component 106 can also facilitate error handling. An error can occur if the timer service is unavailable and the start or end date has passed. If the timer service is offline and the start date should have triggered, by navigating to the page, an error can be presented indicating that scheduling of this page should be reviewed. This can occur when the scheduling has failed or been delayed. In one implementation, when the timer service comes back on, it polls the job stack to determine what documents need to be published, and detects the documents for which the start date has passed, but have not yet published.

Error handling facilitates looking backward in time and cleaning up by executing jobs that should have occurred, had the timer service been operational. Additionally, if a problem occurs when attempting to move a page from minor to major (or major to minor), error handling detects this and provides the appropriate alerting, and can retry the document publication (or unpublication). The number of retries can be configured for a certain duration (e.g., a number of days). In another implementation, the retry process occurs over durations of increasing size (e.g., a minute later, then twenty minutes later, then an hour later, etc.). Error handling can also be logged, as can other non-error events. Logging facilitates basic auditing of approval, scheduling and publication processes.

Figure 2:
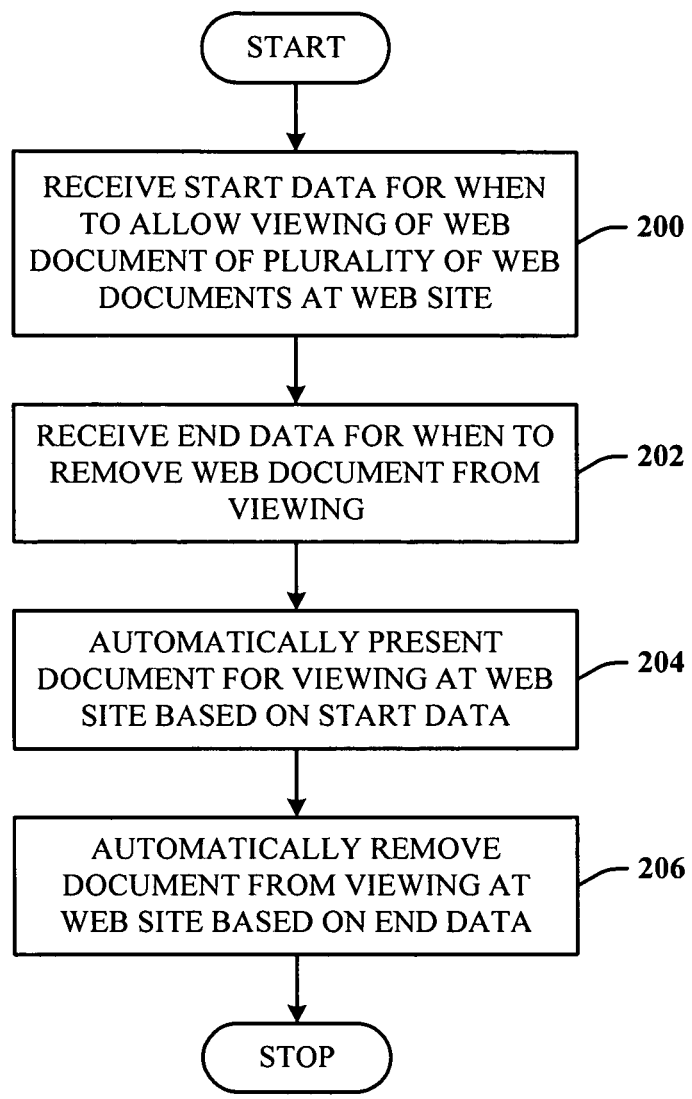
FIG. 2 illustrates a methodology of managing document access.

FIG. 2 illustrates a methodology of managing document access. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, start data is received that indicates when to allow viewing of a web document of a plurality of web documents at a web site. At 202, end data is received that indicates when to remove the document from viewing. At 204, the document is automatically presented for viewing at the web site based on processing of the start data. At 206, the document is automatically removed from viewing at the web site based on processing of the end data.

Figure 3:
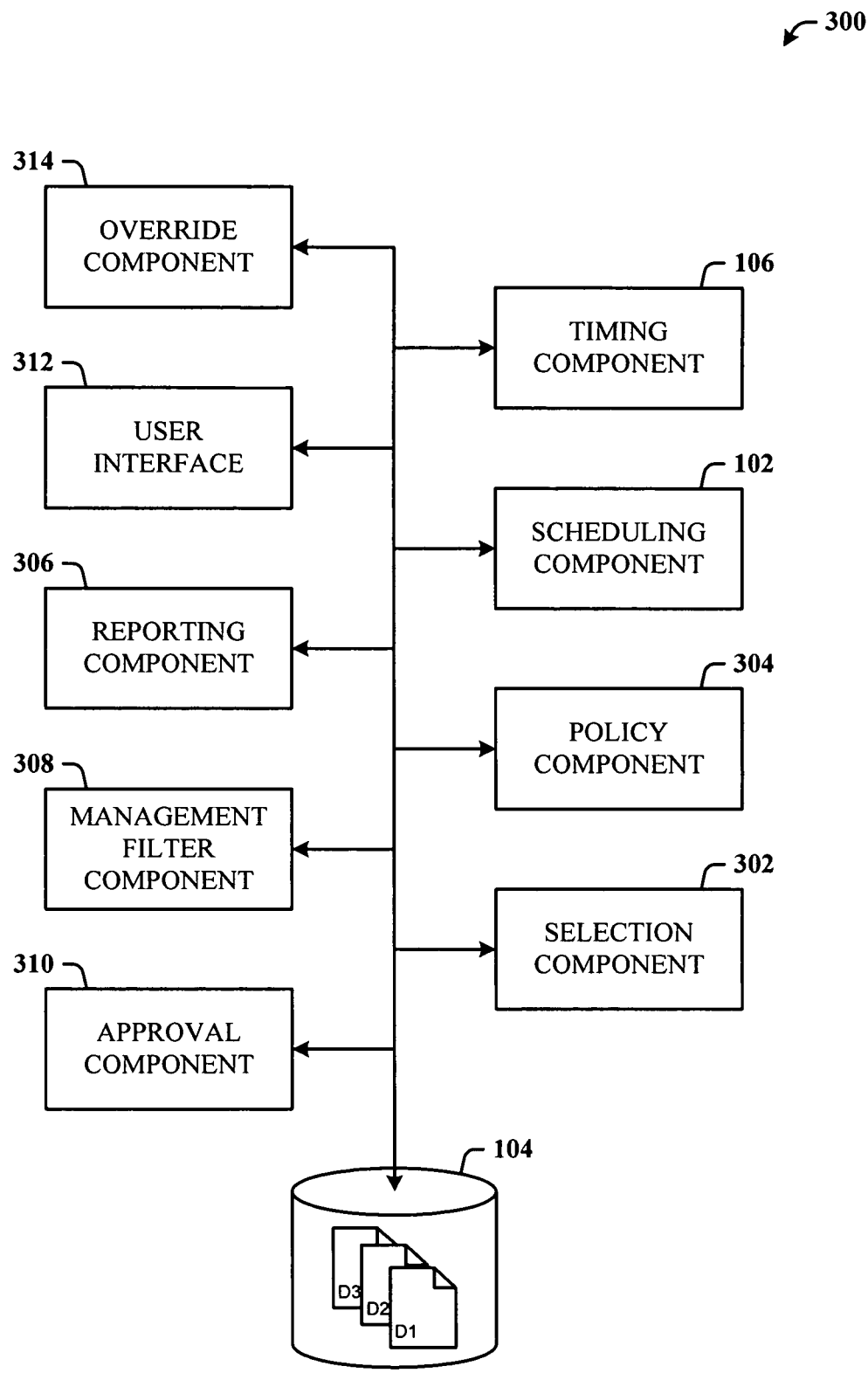
FIG. 3 illustrates an alternative system for managing document access in accordance with the innovation.

FIG. 3 illustrates an alternative system 300 for managing document access in accordance with the innovation. The system 300 includes the scheduling component 102 and timing component 106 of FIG. 1, and other components that facilitate more specific management processes and controls. For example, a selection component 302 is provided for selecting one or more documents (denoted D1, D2 and D3) of the data store 104, for processing (e.g., authoring, editing, replacement, check-in/check-out and publication as major/minor documents).

Note that the data store 104 can be a storage entity associated with a web site on which the document will be published. Alternatively, although illustrated as a single entity, the single data store 104 can comprise multiple storage systems distributed over several network locations, for example, from which documents are processed and via which the documents are posted for viewing.

The selection component 302 can facilitate the selection of multiple documents for bulk (or batch) processing. For example, it is to be appreciated that multiple documents can be authored by different authors who may be working on the same project. As the documents are provided by the authors for review and approval, the selection component 302 can be controlled to select the documents and introduce the documents into the approval process en masse. In another example, the selection component 302 facilitates selection of a document from each of multiple different data stores disposed across a network (e.g., enterprise). In yet another selection example, the selection component 302 can operate in cooperation with the timing component 106 to remove bulk documents from publication (from major to minor) on a single data store or across multiple data stores. The minor documents can then be reviewed, updated, and scheduled for new publication, if desired.

The system 300 can also include a policy component 304 for creating and implementing policies that can be executed in parallel (or sequentially) with the timing and scheduling components (106 and 102). Oftentimes the nature of the page or content can dictate not only when the document should expire, but also what to do with the document once it has expired. For example, certain content should be removed sixty days after publication. In some cases this can be due to legal or business rules, and is often closely linked with retention or maintenance policies. For example, if corporate legal counsel determines that all pages of a certain type need to be destroyed upon expiration it is desirable that this occur automatically without the need for manual purging the expired page(s). In one implementation, a policy can be given a priority status that overrides a scheduling parameter(s) (e.g., an end date). In another implementation, a policy is subservient to the scheduling process, and only provides secondary processes such as notifications, auto-queries of reporting, and so on.

Similarly, a policy might not be about the behavior on or after expiration, but rather what leads up to expiration. For example, a Human Resources web site has a policy that all content must be fresh, thereby permitting the employees to trust the material presented on the web site. As a result there is a need to ensure that every page has been edited or re-approved at least once in last the ninety days. If the page(s) are not refreshed, the page(s) will expire. Once expired, subsequent action to the page(s) can be determined by a retention policy associated with the page content type. The policy capability provides a reliable supplemental mechanism for document management of the innovation.

In another implementation, one policy can be configured to trigger another policy, running either concurrently or sequentially therewith. For example, a retention policy can trigger a notification policy that notifies a user of a predetermined date (e.g., ten days) prior to expiration of a document. This provides a publish-and-forget scenario where the user will be notified of an upcoming event associated with scheduling and approval process, for example. Notification can be via conventional communications technologies such as e-mail, messaging (e.g., SMS-short message service, MMS-multimedia message service, instant messaging), voice mail, audio file attachment, and so on. The notification can be a reminder to either refresh the page content, allow the page to expire, or delete the document. A notification policy can be created that is based on the end date. In an alternative implementation or in combination therewith, the notification policy triggers off the start date.

Over time the amount of expired pages could easily exceed the current or active pages. As a result, the site (e.g., site management tool or authoring tool) can become cluttered with pages that, although important, are irrelevant to the daily task of managing content. To avoid having large numbers of irrelevant pages expired pages can be filtered out of the regular view. In some cases, expiration means that the page is taken offline, and hence, filtering a document list can suffice. However, in other cases, a page can be categorized as "old" and should no longer be in the "current" area of the web site, and therefore, expiration can be more about re-locating the stale document to an archive or vault.

This difference in behavior can be defined in the retention policy so that a user can be assured that when a new press release is made, the press release content type has a retention policy that forces the news to relocate to an archive at the end of the day, for example.

Page replacement can be accomplished with the automated scheduling synchronization by overlapping jobs and/or with job and policy execution. For example, a published page has an end date and a new minor version is approved to go live on a future date that is on or before the date that the published page will expire. More specifically, a version 1.0 page is now public and expires January $1^{st}$. Knowing the publish page will expire January $1^{st}$ (via a notification policy), the version 2.0 page can be edited, but not being ready, the version 2.0 page is still minor (e.g., at a stage of preparation that is version 1.2). Once approved, the replacement page can be scheduled for publication on an earlier date (e.g., December $26^{th}$). When published, the replacement page can have a new end date that exceeds the previous end of the page to be replaced. The new end date for the replacement page will override the previous end date. Thus, the previous published page can become an archived/historical major version which is no longer published to the web site.

For example, a user can make updates to a copy of a document currently being published and have the updated copy automatically replace the currently published version during the scheduled duration of the original document, or at the end of the publication period.

A reporting component 306 facilitates reporting of information designated by the user. For example, a report can be configured and output for all documents expiring on a given date or over a specified duration (e.g., a week). Reporting can be configured according to a given web site. For example, a report can be enabled for automatic generation based on parameters such as by site, by an area of a web site, by author and date. Additionally, reports can be generated based on a combination of the previously-mentioned parameters, and other parameters such as content type, page type, importance, and so on. Information can also be queried using search terms. For example, based on the query terms, all documents scheduled for publication on a specific date of a specific web site can be searched and retrieved. Other queries can be utilized to retrieve the desired information.

The system 300 can include a management filter component 308 for site management of content and documents, for example. When a site manager views the pages of a web site, filtering allows for reviewing the potentially hundreds of documents that have aged out, are scheduled for publication, etc., and other filter parameters such as date, document size, content type, and author, to name a few. The filter component 308 facilitates grouping of documents from many different sites for presentation and management overview, and then according to criteria used in searching the sites, and site documents, for example.

An approval component 310 facilitates an approval process of the system 300 by allowing access to minor documents by designated approvers, for example. As described supra, the approval process can be part of the scheduling and timing processes. The final approval can be postponed (e.g., at the end of an approval workflow) until a later time when the start date is reached, at which point the start date timer job performs the approval, moving the item from minor to major.

A user interface (UI) 312 is provided for user interaction with one or more algorithms that facilitate configuration and control of the system 300. The UI 312 can provide the basis for scheduling at least start and end dates for publication.

An override component 314 accommodates pluggable modules that when interfaced, facilitate override capabilities of some or all parameters and functionality of the system components (102, 104, 106, 302, 304, 306, 308, 310 and 312). For example, default settings provided by the system components can be overridden by implementation of a third-party module that implements customized settings for a customized application. This provides pluggable module extensibility by interfacing new features for a designated application.

The override component 314 can receive new user interface APIs (application program interfaces) that present a customized view of configuration windows, scheduling input capabilities, approval capabilities, and data fields. Reporting can be customized using the override capability, as well as new policies and selection capabilities implemented by simply interfacing the custom module via the override component 314. These are just a few of the capabilities that can be added by third-party vendors or administrators, for example.

A bulk publication capability further facilitates an "area online" scenario, where a new section or set of documents of a web site are intended to come online at a future date, but the site currently presents a "Site Under Construction" notice. As a security measure to prevent the accidental exposure or snooping of pages before publication, the user can group approved pages in a secure location until such time that the start date arrives. The system 300 can then expire the construction page and batch publish all the desired pages, automatically. This capability facilitates mass publishing for a web site or across many web sites.

Figure 4:
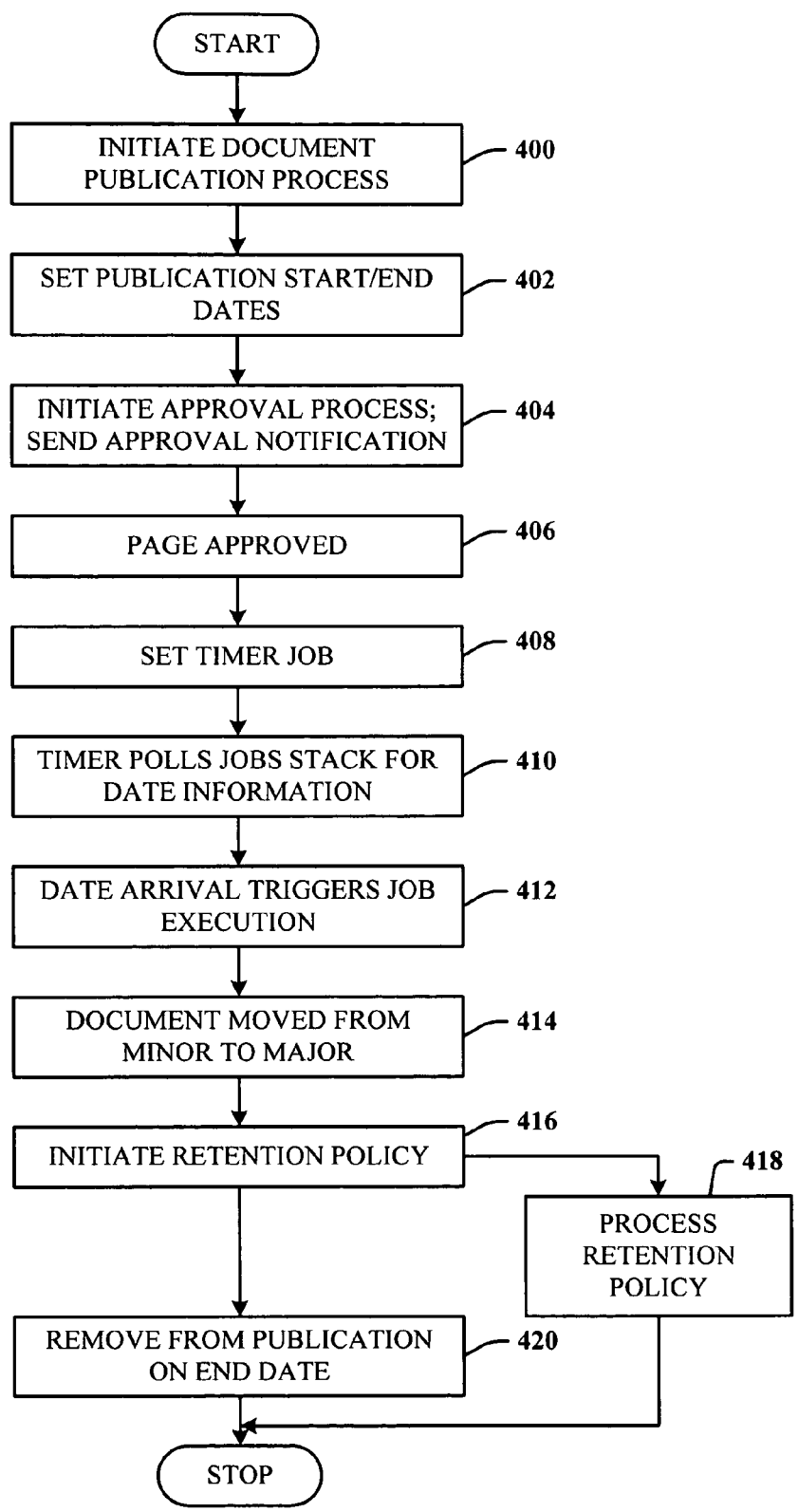
FIG. 4 illustrates a method of document scheduling and publication.

Referring now to FIG. 4, there is illustrated a method of document scheduling and publication. At 400, the document publication process is initiated. This can be performed manually by the user making a UI selection, or automatically, according to a script, for example. At 402, the publication start date is set. This can be set by an approver or by the author prior to initiation of the publication process, for example. The end date can also be set. However, it is to be appreciated that where the end date is not stipulated, the document can stay published indefinitely, unless overridden by a policy or some other mechanism. These configuration settings can be made via the UI. At 404, an approval process is initiated, and notifications sent to the appropriate approval users. At 406, the page (or document) is approved. At 408, the timer jobs are registered for execution. At 410, a timer polls a job stack for date information. At 412, arrival of the date triggers execution of the corresponding job. At 414, the document is moved from minor to major. Optionally, at 416, a retention policy is initiated. At 418, the retention policy is executed concurrently with the publication process when the document is major. At 420, the document is removed from publication. This can be based on the end date and/or the retention policy.

Figure 5:
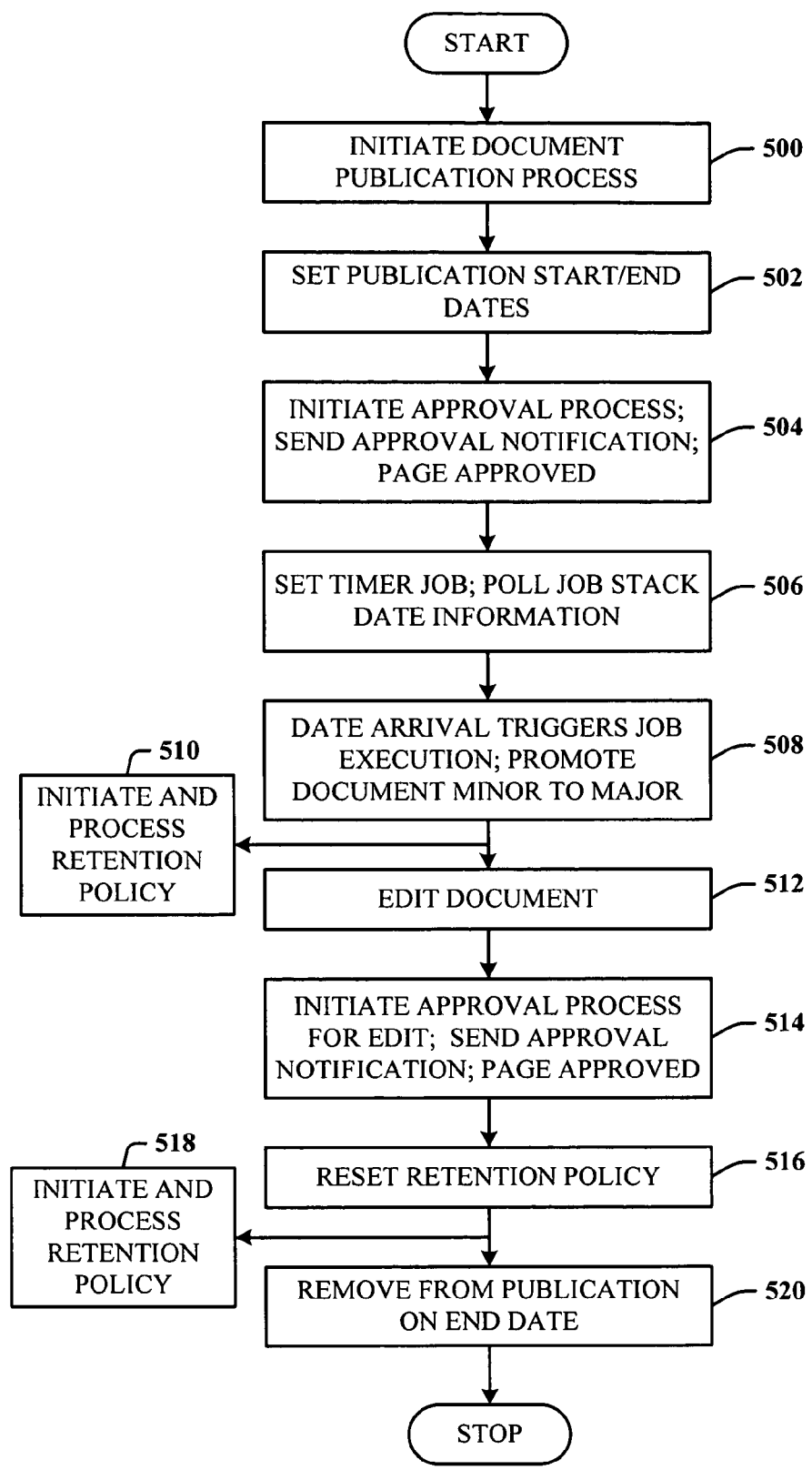
FIG. 5 illustrates an alternative method of document scheduling and publication.

FIG. 5 illustrates an alternative method of document scheduling and publication. At 500, the document publication process is initiated. At 502, the publication start/end dates are set. At 504, the approval process is initiated, an approval notification is sent to one or more approvers, and the page is approved. At 506, the timer job is set, and the job stack polled for date information. At 508, the trigger date arrives, the job is executed, and the document is promoted from minor to major. At 510, optionally, a retention policy is initiated in parallel with the publication process. At 512, a copy of the existing published document is created and edited. At 514, the approval process is reinitiated for this updated copy, approval notifications sent to the appropriate approver(s), and the page approved. At 516, the retention policy is reset to account for the updated document. At 518, the retention policy is reinitiated and processed. At 520, the publication end date for this document is met, and the document is removed from publication (changed from major to minor).

Figure 6:
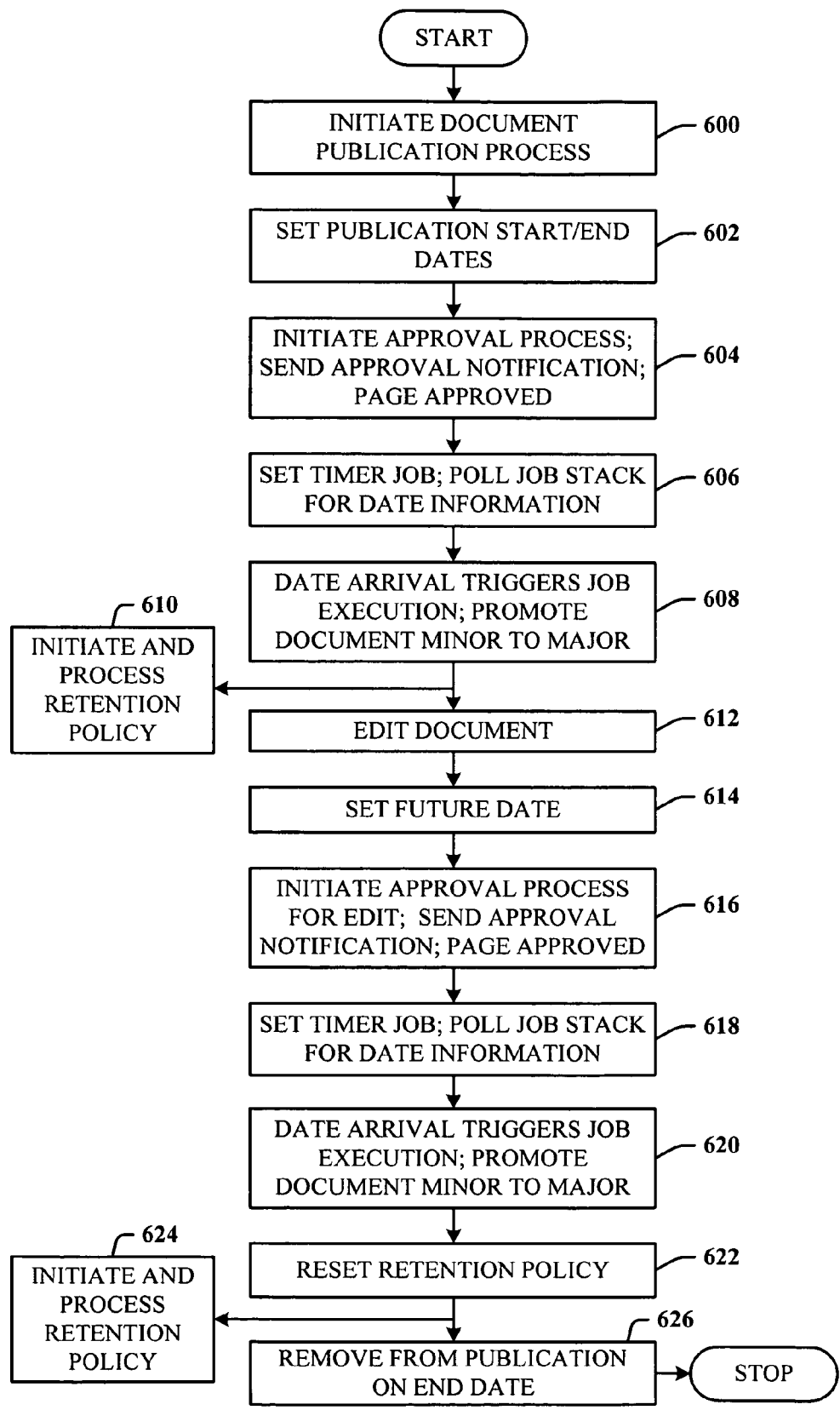
FIG. 6 illustrates a method of future date processing for document scheduling and publication.

FIG. 6 illustrates a method of future date processing for document scheduling and publication. At 600, the document publication process is initiated. At 602, the publication start/end dates are set. At 604, the approval process is initiated, an approval notification is sent to one or more approvers, and the page is approved. At 606, the timer job is set, and the job stack polled for date information. At 608, the trigger date arrives, the job is executed, and the document is promoted from minor to major. At 610, optionally, a retention policy is initiated in parallel with the publication process. At 612, a copy of the existing published document is created and edited. At 614, the future date is set. At 616, the approval process is reinitiated for this updated copy, approval notifications sent to the appropriate approver(s), and the page approved. At 618, the timer job is set, and job stack polled for date information. At 620, the future date arrives, triggers job execution, and the document is promoted from minor to major. At 622, the retention policy is reset to account for the updated document. At 624, the retention policy is reinitiated and processed. At 626, the publication end date for this document is met, and the document is removed from publication (changed from major to minor).

Figure 7:
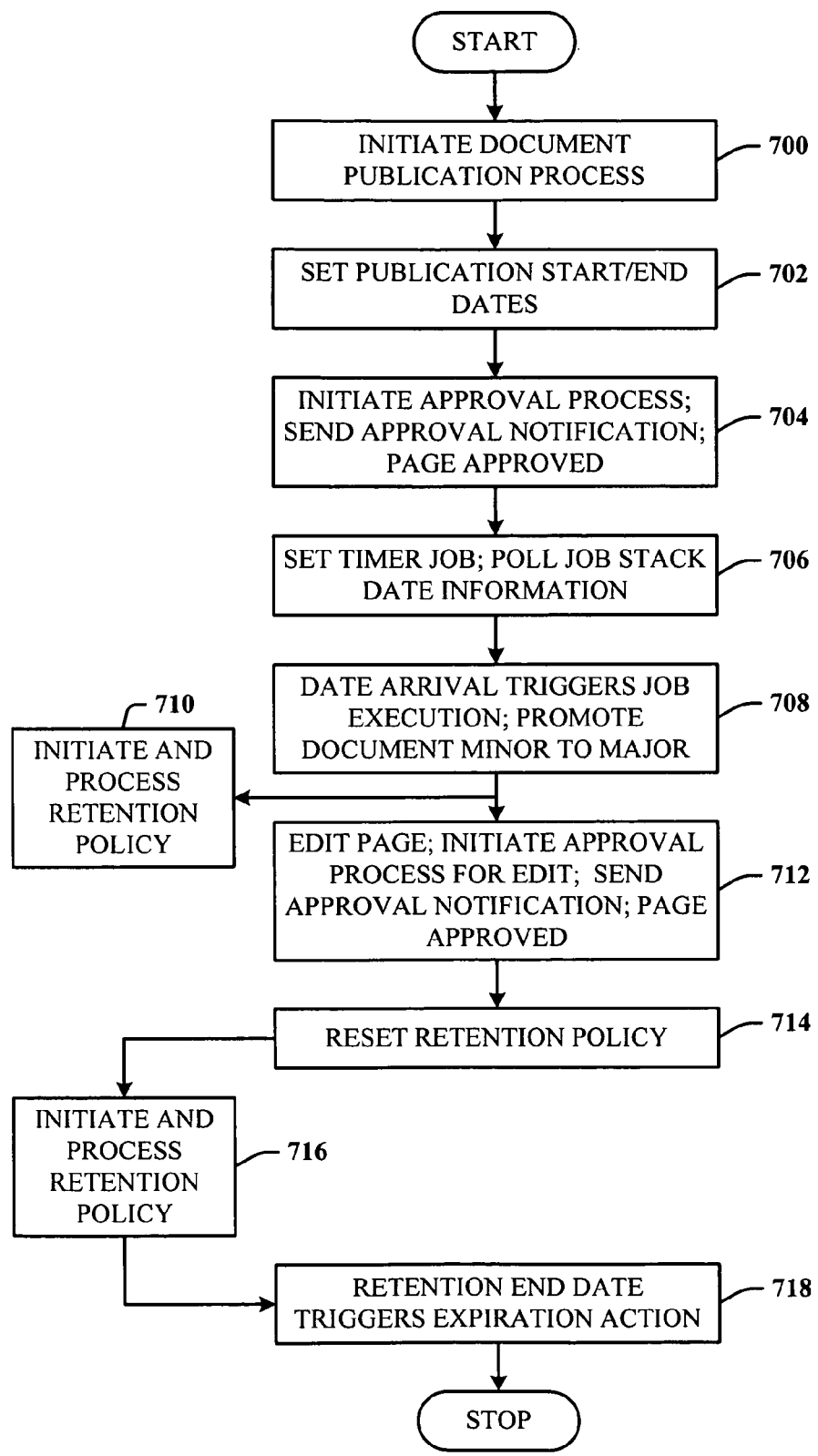
FIG. 7 illustrates a method of document scheduling and publication when an end date never arrives.

FIG. 7 illustrates a method of document scheduling and publication when an end date never arrives, but a policy executes to terminate document publication. At 700, the document publication process is initiated. At 702, the publication start/end dates are set. At 704, an approval process is initiated, an approval notification is sent to one or more approvers, and the page is approved. At 706, the timer job is set, and the job stack polled for date information. At 708, the trigger date arrives, the job is executed, and the document is promoted from minor to major. At 710, optionally, a retention policy is initiated in parallel with the publication process. At 712, a copy of the page is pulled for editing, the approval process is reinitiated, approval notifications sent, and the updated page approved. At 714, the retention policy is reset to account for the updated document. At 716, the retention policy is reinitiated and processed. At 718, the publication end date for this document is met, and the policy expiration actions are commenced to remove the document from publication (changing from major to minor).

Figure 8:
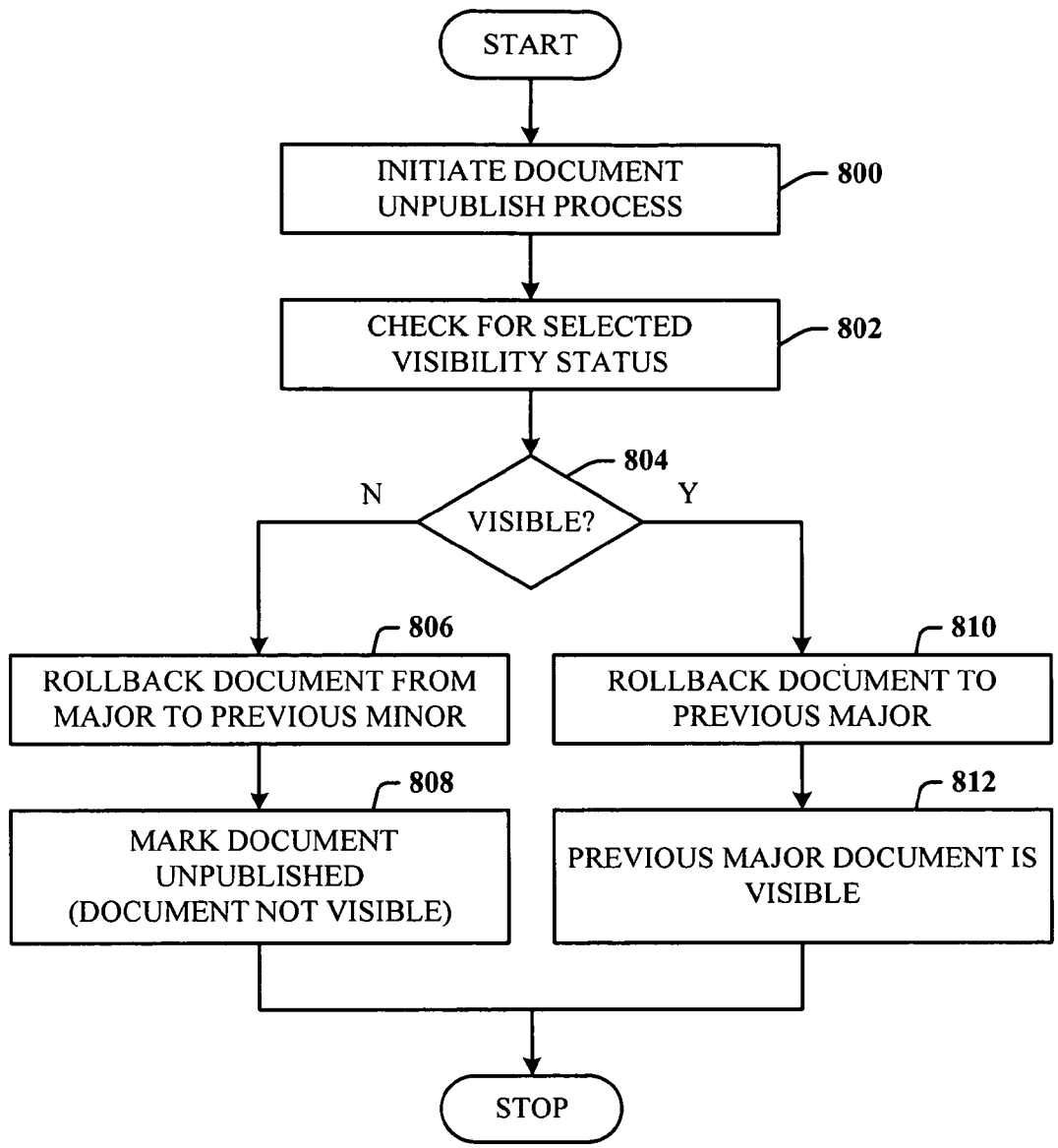
FIG. 8 illustrates a method of rolling back a published document in accordance with the scheduling algorithm of the innovation.

FIG. 8 illustrates a method of rolling back a published document in accordance with the scheduling algorithm of the innovation. At 800, a document unpublish (or unpublication) process is initiated. At 802, a check is made to determine if the document has been selected for visibility. If not visible, at 804, flow is to 806 to rollback the document from major to a previous minor version. At 808, the document is marked unpublished, and hence, is not visible. Alternatively, if the rollback document is to be visible, at 804, flow is to 810, to rollback the major document to a previous major version. Hence, the previous major document is made visible, as indicated at 812.

Figure 9:
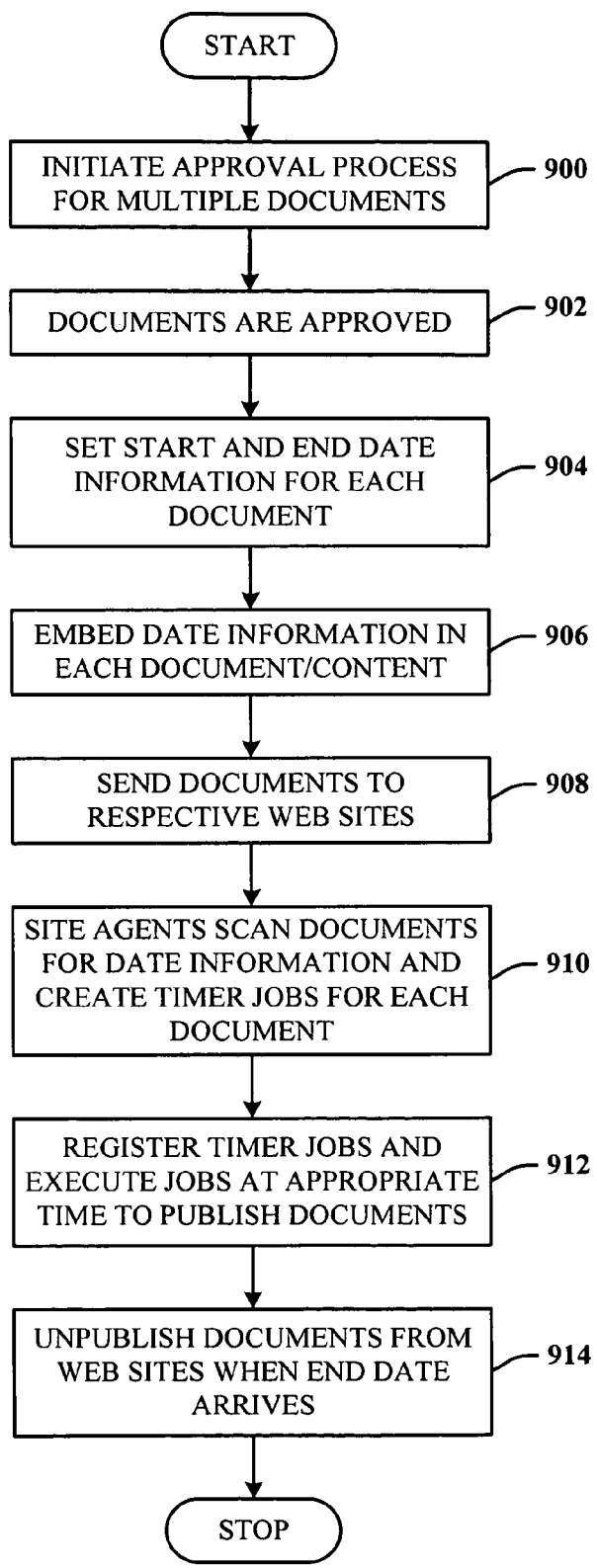
FIG. 9 illustrates a method of bulk document publication.

FIG. 9 illustrates a method of bulk document publication. At 900, an approval process is initiated on multiple documents. At 902, the documents are approved. The document approval process can occur over days or weeks, for example, such that approved documents are accumulated for ultimate transmission to the desired production server, and await publication at the appointed time. At 904, the start date and end date are set. At 906, the date information is embedded (e.g., via metadata) in the document and/or document content. At 908, the documents are sent to the respective sites. At 910, when received at the sites, a site agent scans the documents for the date information, and sets timer jobs for each of the documents. At 912, the timer jobs are registered, and at the appointed time, the timer jobs publish documents to respective web site areas. At 914, upon arrival of the appointed end date, the documents of the respective web site areas are unpublished.

Figure 10:
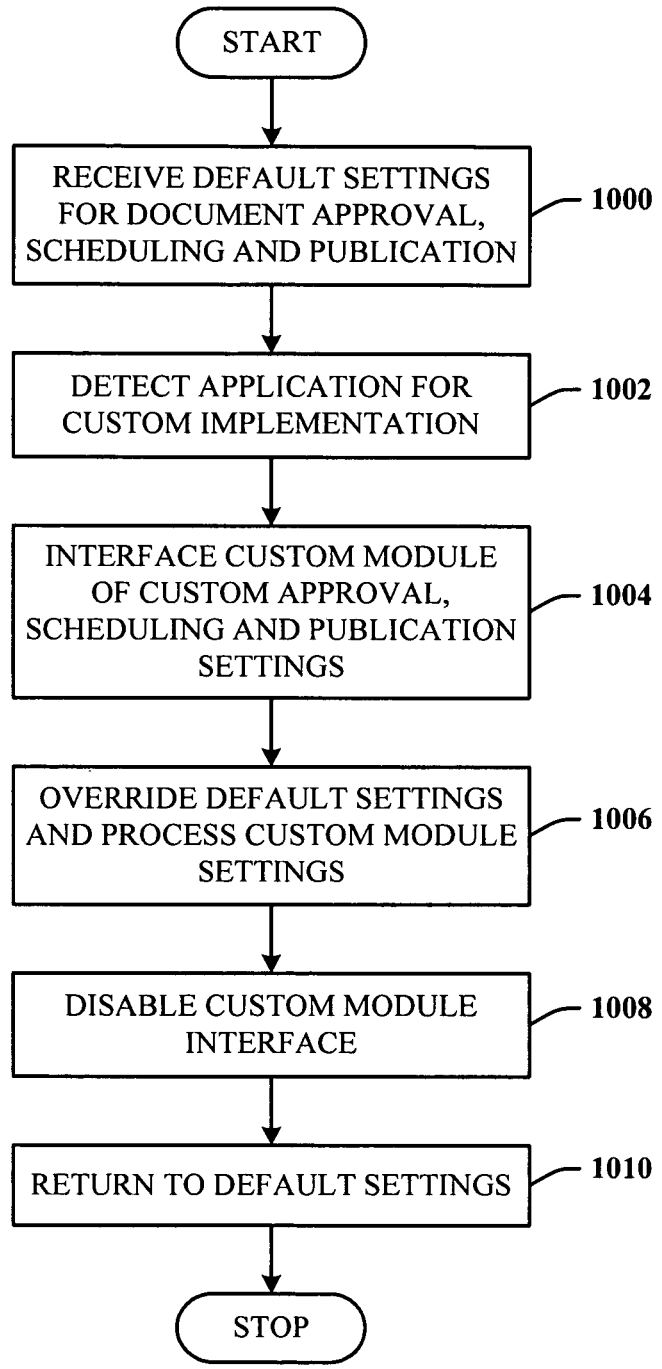
FIG. 10 illustrates a method of overriding default settings using a custom pluggable module.

FIG. 10 illustrates a method of overriding default settings using a custom pluggable module. At 1000, default settings are received for document approval, scheduling and publication. At 1002, an application for custom implementation is detected. In this method, the custom module has already been installed, but can be enabled/disabled as desired. This can be performed manually or automatically. In other words, if the system detects that the custom module should be made operational, the custom module can be automatically enabled (e.g., by a triggering event or data), and the custom settings provided therein are imposed to override the defaults settings. At 1004, the custom module is operationally interfaced (or enabled) for override of one or more of approval, scheduling and publication processes, policies, or settings. At 1006, once enabled, the custom settings are imposed and override the default settings. At 1008, as monitored, if the custom module is no longer needed, it can be disabled. The defaults settings can then be re-enabled, as indicated at 1010.

Figure 11:
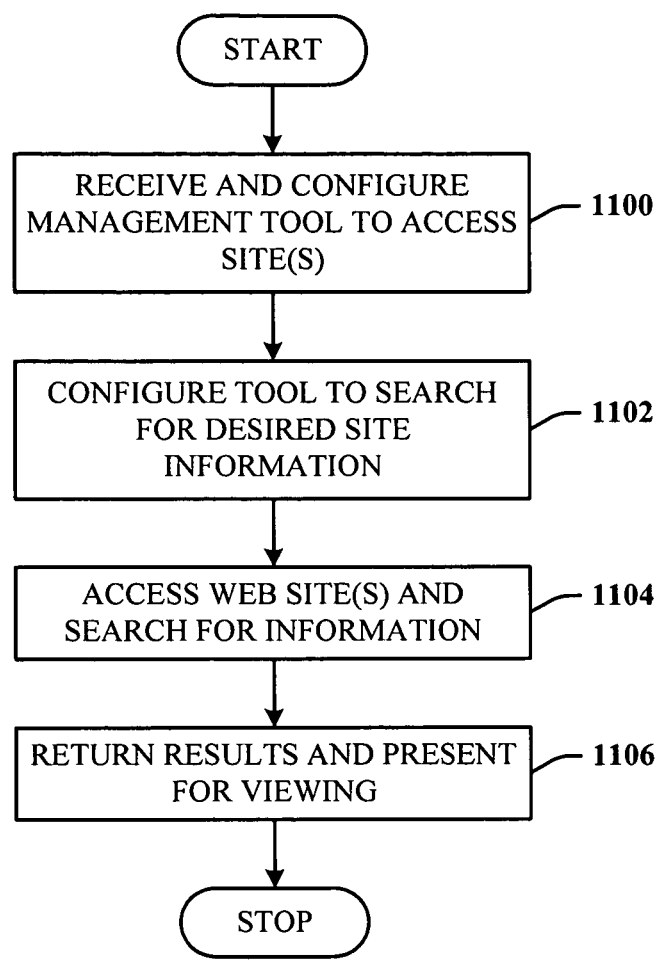
FIG. 11 illustrates a method of management filtering for viewing site properties and documents.

FIG. 11 illustrates a method of management filtering for viewing site properties and documents. At 1100, a management tool is configured to access one or more web sites. These can be public or private web sites (e.g., intranet, authoring, production, Internet) where publication is being performed. At 1102, the tool is configured to filter or search for only specific types of documents (e.g., minor, major, approved) across the sites. At 1104, the management tool accesses the web sites and searches for the desired information. At 1106, the results are returned and presented for viewing. The management filter tool can be configured to perform the filter operation automatically or manually. For example, a user can create a script that executes to automatically filter all or selected sites for the desired information at predetermined times. This information can then be communicated to the interested user.

Figure 12:
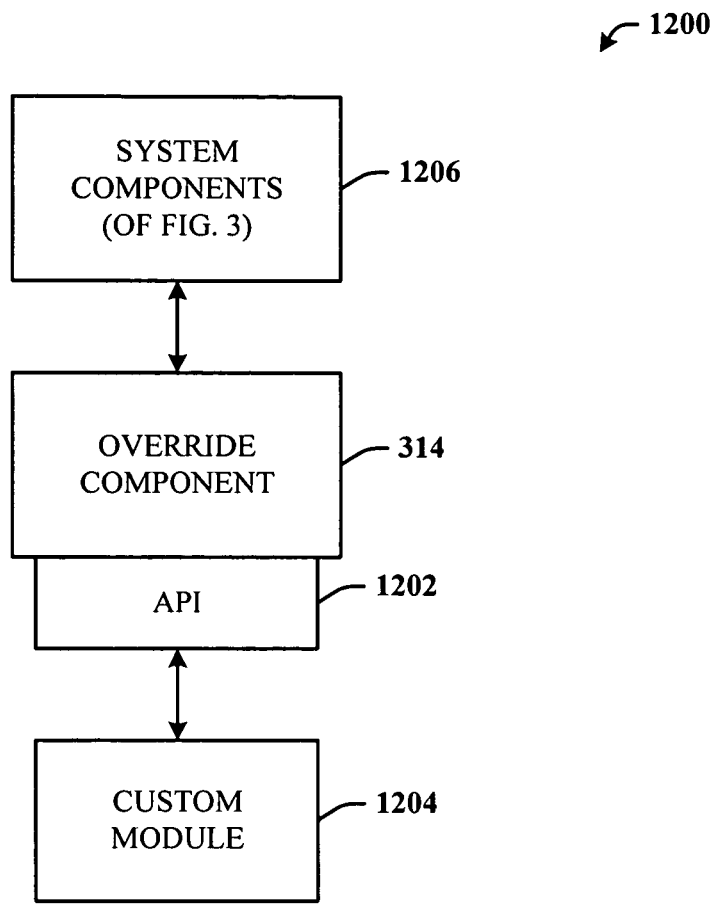
FIG. 12 illustrates a more detailed representation of a pluggable module system for customized implementations.

FIG. 12 illustrates a more detailed representation of a pluggable module system 1200 for customized implementations. Here, the override component 314 includes an API 1202 that facilitates interfacing a custom module 1204 by a third-party entity, for example. The custom module 1204 includes the software hooks that are compatible with the API 1202 for data exchange and calls for interacting with other components 1206 of FIG. 3.

Figure 13:
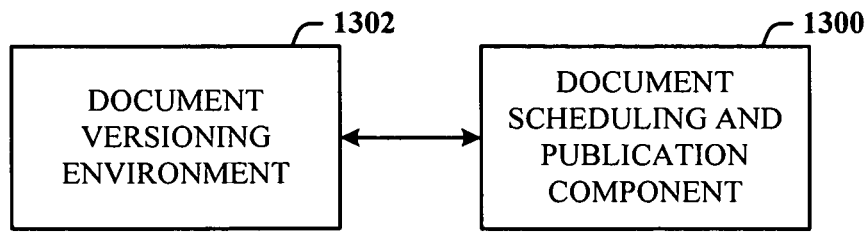
FIG. 13 illustrates leveraging of document versioning environment for use in scheduling versioned documents for publication.

FIG. 13 illustrates leveraging of a document versioning environment for use in scheduling versioned documents for publication. Here, a document scheduling and publication component 1300 can interface to a conventional document versioning environment 1302 to facilitate approval, scheduling and publication of the versioned documents as desired.

Figure 14:
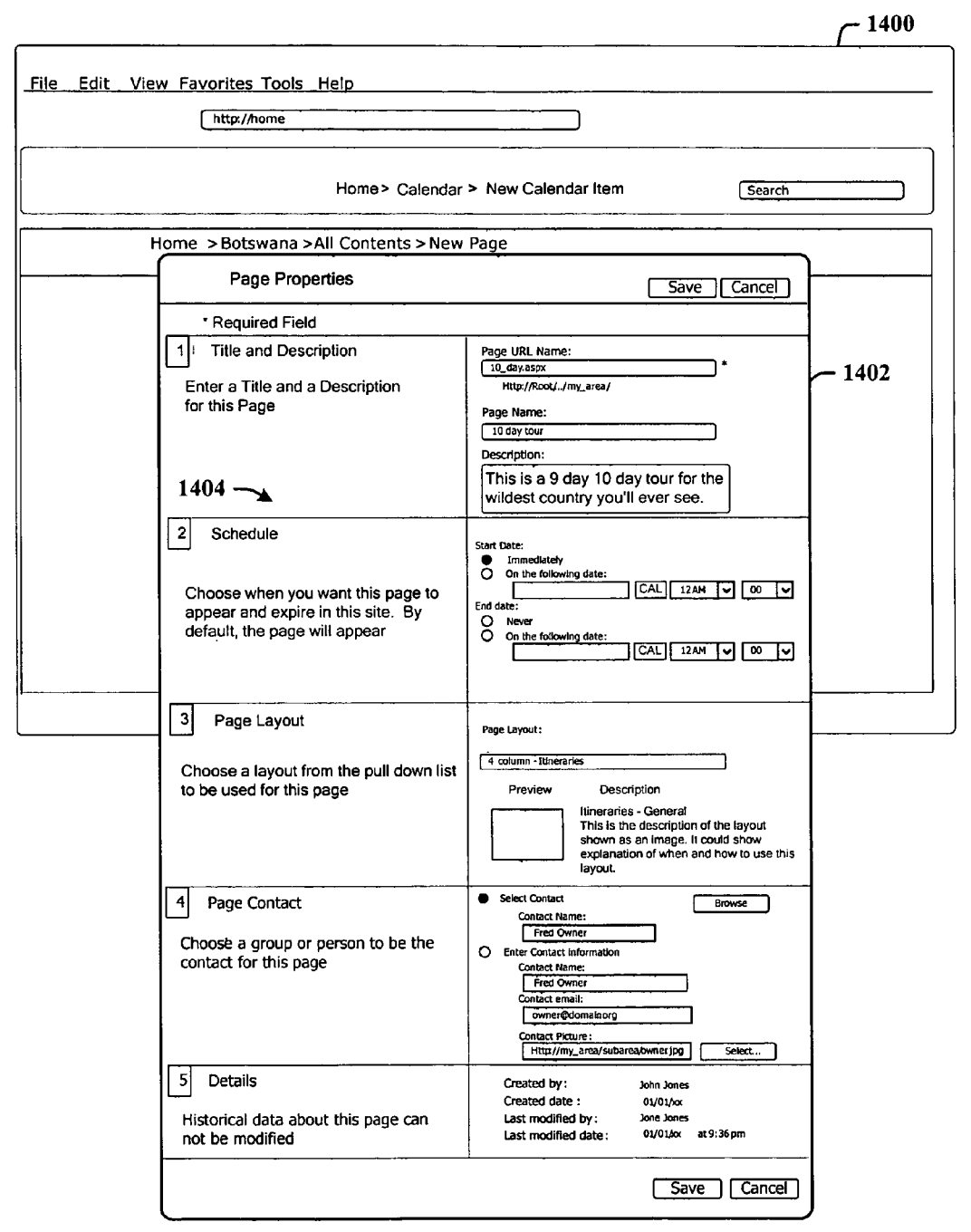

FIG. 14 illustrates one implementation of a user interface 1400 for scheduling document publication. When a user navigates to create a new page, a Page Properties window 1402 is presented for, among other things, scheduling page publication processes. For example, a Schedule section 1404 can include Start Date fields and selectors for selecting time and date for publication start, and End Date fields and selectors for selecting time and date for publication expiration. Here, the start date can be set for immediately or as some further time in the future. The end date can be set to never expire or at a future date and time. Both of the start and end data sections can include a calendar selector (denoted CAL) for automatically presenting a calendar tool to make the desired date selections.

This is only one example of the type of user interface features that can be provided for scheduling in accordance with the innovation. For example, other implementations can include floating menus that appear when a mouse pointer hovers over an active artifact. In yet another automated implementation, the scheduling data can be automatically populated based on a previously scheduled document, such that the user need only save the settings, rather than have to re-enter the same settings. It is also to be understood that the user interface facilitates edit operations to existing pages/documents.

As a general summary of some of the characteristics of the innovation, document levels of a versioning environment can be leveraged for scheduling implementation. Users can set the start and end dates for a document (e.g., web page), and then invoke scheduling by calling a scheduling API. When a scheduling method is invoked, a web page is effectively approved, but rather than immediately publishing the web page as a major version, the page is held back as a minor version (or draft) so that only collaborating authors or approvers can view the page. The web page enters the 'scheduled' state at this point.

At the time that a web page is scheduled for a future start date, or a future end date, the timer job definition is registered with the timer service to be invoked at a future date. The job definition for the start date, as well as for the end date, can be a code callout. The start and end job definitions are registered when a first web site is provisioned. The job definitions are set to execute at predetermined intervals (e.g., every minute), meaning that a background process for the timer service checks the database every minute, for example, to determine whether there is a start or end date timer job that has reached its delivery time. If so, then code registered for the start or end date is invoked. The code callouts can be registered via well-known GUIDs (globally unique IDs), meaning that customers are provided an option to define custom code callouts for the start and end date jobs, thereby overriding the default scheduling behavior. This provides scheduling behavior that is pluggable and extensible.

The start date timer job moves a web page from the minor (draft) level to the major (published) level so that all users who have the appropriate permissions to view the major versions of a web site will then have access to the web page. The end date timer job moves the web page from the major (published) level to the minor (unpublished) level, effectively taking the document offline.

An event handler is registered to recognize when a web page is being approved, and if the start date is in the future, then the handler effectively postpones approval so that the web page will not become published until the start date is reached. This is accomplished by pausing or suspending the approval and registering a start date timer job for the future, as described herein. The state of the document is elevated from "approved" to "scheduled". Later, when the start date/time is reached, the final step in the approval/publication process happens when the state of the scheduled document is raised another level to "published" as the document goes from minor to major.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
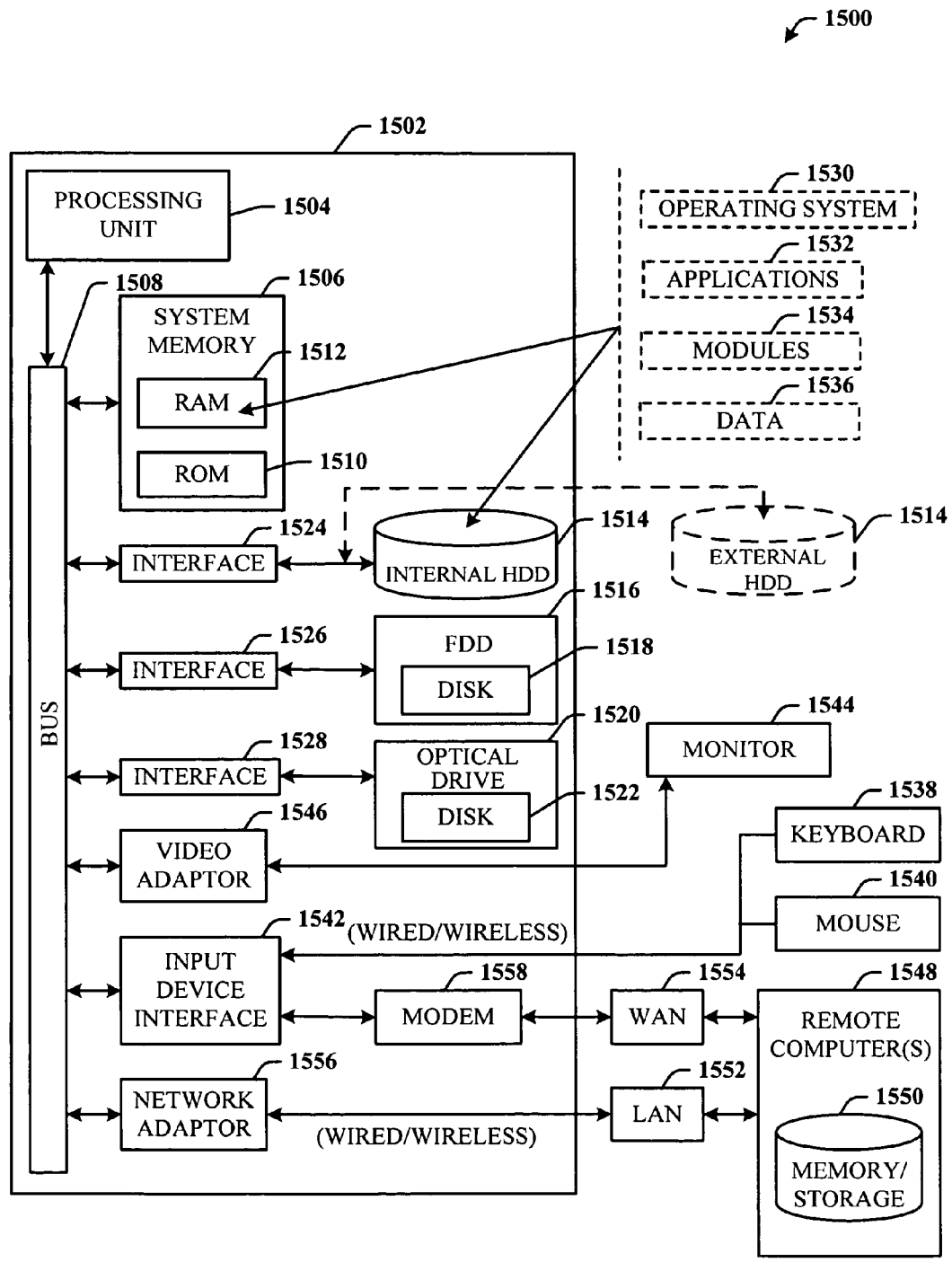
FIG. 15 illustrates a block diagram of a computing system operable to execute the disclosed approval, scheduling and publication architecture.

Referring now to FIG. 15, there is illustrated a block diagram of a computing system 1500 operable to execute the disclosed approval, scheduling and publication architecture. In order to provide additional context for various aspects thereof, FIG. 15 and the following discussion are intended to provide a brief, general description of a suitable computing system 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary computing system 1500 for implementing various aspects includes a computer 1502, the computer 1502 including a processing unit 1504, a system memory 1506 and a system bus 1508. The system bus 1508 provides an interface for system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. The modules 1534 can include the components of FIG. 3, as well as custom modules employed for custom applications. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 16:
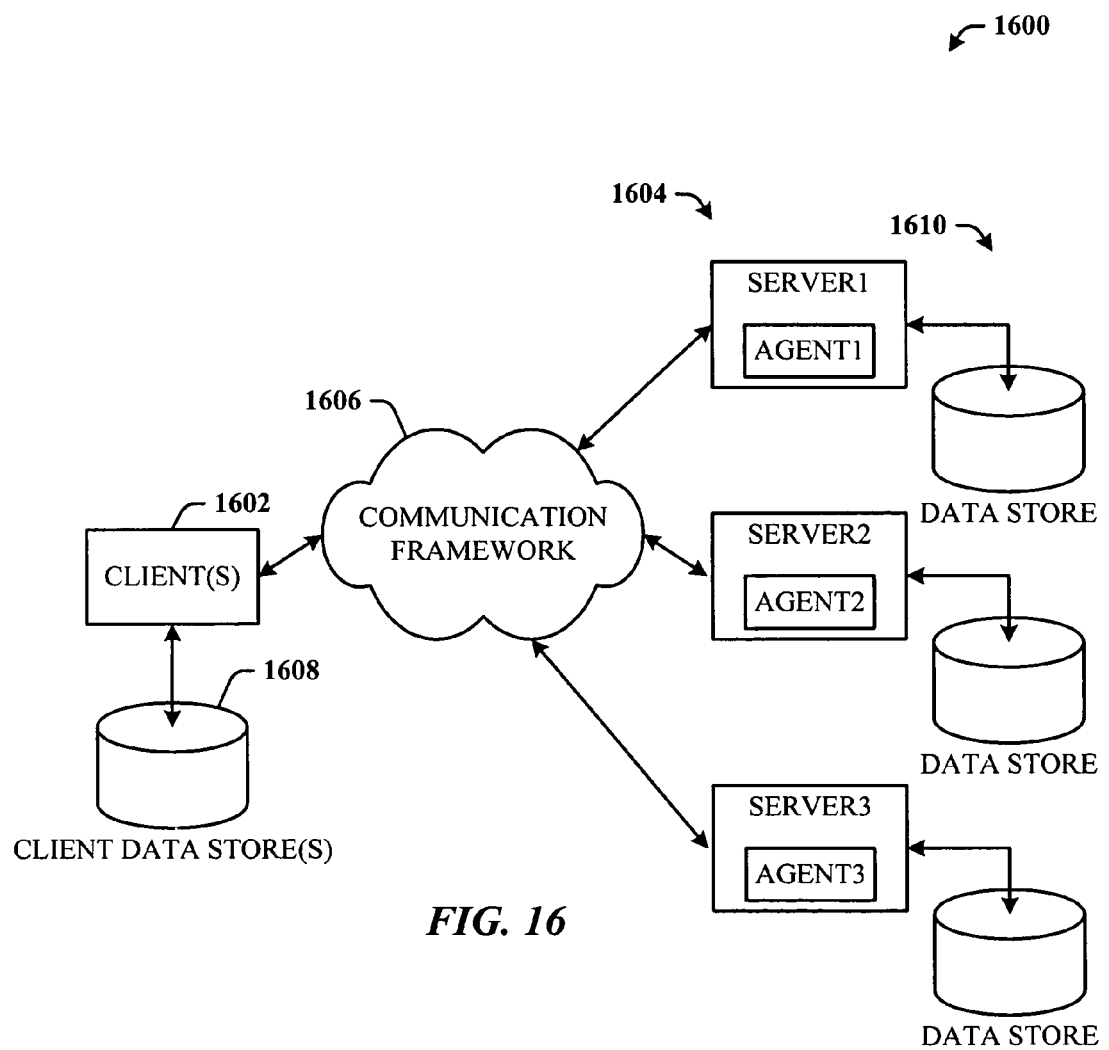
FIG. 16 illustrates a schematic block diagram of an exemplary computing environment for the disclosed approval, scheduling and publication architecture.

Referring now to FIG. 16, there is illustrated a schematic block diagram of an exemplary computing environment 1600 for the disclosed approval, scheduling and publication architecture. The system 1600 includes one or more client(s) 1602, which can be hardware and/or software (e.g., threads, processes, computing devices). The client(s) 1602 can house cookie(s) and/or associated contextual information by employing the subject innovation, for example.

The system 1600 also includes one or more server(s) 1604 (denoted SERVER1, SERVER2, and SERVER3) and associated data stores. The server(s) 1604 can also be hardware and/or software (e.g., threads, processes, and computing devices) and house threads to perform transformations by employing the architecture, for example. One possible communication between a client 1602 and a server 1604 can be in the form of a data packet adapted to be transmitted between two or more computer processes. The data packet may include a cookie and/or associated contextual information, for example. The system 1600 also includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

Here, the servers 1604 can employ web sites for the presentation of documents and content in response to the disclosed document approval, scheduling and publication architecture. Each of the servers 1604 can further include corresponding agents (denoted AGENT1, AGENT2, and AGENT3) that handle document approval, scheduling and publication for that site. Alternatively, the agents of production sites (SERVER2 and SERVER3) receive jobs from a remote authoring site (e.g., SERVER1), and execute the jobs at the appointed time and date. The respective server data stores can store the minor documents until time for publication. Additionally, the data stores can archive stale documents, as desired. A management filter tool hosted in SERVER1 can access and filter information of interest from the production sites (SERVER2 and SERVER3) for presentation and/or analysis and processing.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that manages document access, comprising:
    a scheduling component that configures scheduling information to control access to documents at a web site by:
        receiving start time information that indicates when to allow viewing of each of the documents;
        receiving end time information that indicates when to remove each of the documents from viewing; and
        bundling the scheduling information of each of the documents with respective start time information and end time information as individual jobs and adding the jobs to a job stack for execution at a scheduled time;
    a timing component configured to execute jobs based on the scheduling information, and control access to the documents by:
        polling the job stack for pending lobs to be executed;
        executing any pending job on the job stack for which the scheduled start time or scheduled end time has arrived by automatically publishing the document associated with the pending job for viewing at the web site or automatically removing the document from viewing at the web site;
        facilitating error handling of the timing component due to a temporary failure or delay to timely execute pending jobs by polling the job stack for an overdue job for which the scheduled start time has passed and determining that the documents associated with the overdue job has yet to be published for viewing at the web site; and
        publishing the document associated with the overdue job for viewing at the web site; and a hardware processor that executes computer-executable instructions in a memory associated with the scheduling component and the timing component.

2. The system of claim 1, wherein the scheduling component allows configuration of start time and end time information that correspond to when each of the documents is accessed.

3. The system of claim 2, wherein execution of the jobs is triggered by an automated background process.

4. The system of claim 1, wherein the timing component monitors which documents are moved between a minor, unpublished level, and a major, published level.

5. The system of claim 1, further comprising an approval component configured to allow approval of each of the documents for scheduled access based on the scheduling information.

6. The system of claim 1, further comprising a policy component configured to impose a policy in combination with execution of the jobs.

7. The system of claim 1, further comprising an override component configured to override the scheduling information with a custom setting in accordance with a specific application.

8. The system of claim 1, further comprising a reporting component configured to automatically generate a report based on least one of parameters by web site, by an area of a web site, by author, or by date.

9. A computer-implemented method of managing document access, comprising acts of:
    receiving start time information that indicates when to allow viewing of each of a plurality of documents at a web site;
    receiving end time information that indicates when to remove each of the documents from viewing;
    bundling the start time information and end time information of each of the documents as individual jobs and adding the jobs to a job stack for execution at a scheduled time;
    polling the job stack for pending jobs to be executed;
    executing any pending jobs for which a scheduled start time or a scheduled end time has arrived by automatically publishing the document associated with the pending job for viewing at the web site or automatically removing the document from viewing at the web site;
    facilitating error handling due to a temporary failure or delay to timely execute pending jobs by polling the job stack for an overdue job for which the scheduled start time has passed and determining that the document associated with the overdue job has yet to be published for viewing at the website; and
    publishing the document associated with the overdue job for viewing at the web site.

10. The method of claim 9, further comprising approving the plurality of documents for publication, and presenting the plurality of documents simultaneously to an area of the web site.

11. The method of claim 9, further comprising checking a database for pending jobs for which the scheduled start time or end time has arrived.

12. The method of claim 9, wherein automatically publishing the document for viewing at the web site or automatically removing the document from viewing at the web site comprising one or both of:
    automatically moving a document from a minor, unpublished level to a major, published level when publishing the document for viewing; and automatically moving a document from the major, published level to the minor, published level or archive major version when removing the document from viewing.

13. The method of claim 9, wherein the start time information is a start date, and the end time information is an end date.

14. The method of claim 9, further comprising overriding an existing approval process with a custom approval workflow.

15. The method of claim 9, further comprising providing access to a published document based on user permissions.

16. The method of claim 9, further comprising filtering documents of multiple web sites by web site for presentation management.

17. The method of claim 9, further comprising one or more of:
- sending a notification message prior to publication of a document;
- sending a notification message prior to removing a document from viewing; and
- sending a reminder notification on a regular basis for a document that has no end date, to allow a user to verify that data is current.

18. The method of claim 9, further comprising postponing approval of a document based on a future start date.

19. The method of claim 9, further comprising removing a document from viewing based on expiration of a policy.

20. The method of claim 9, further comprising logging error handling for auditing of approval, scheduling, and publication processes.

* * * * *